(12) United States Patent
Natu et al.

(10) Patent No.: US 10,346,177 B2
(45) Date of Patent: Jul. 9, 2019

(54) BOOT PROCESS WITH PARALLEL MEMORY INITIALIZATION

(71) Applicant: Intel Corporation, Santa Clara, CA (US)

(72) Inventors: Mahesh S. Natu, Sunnyvale, CA (US); Wei Chen, Portland, OR (US); Jing Ling, Milpitas, CA (US); James E. McCormick, Jr., Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 15/378,878

(22) Filed: Dec. 14, 2016

(65) Prior Publication Data

US 2018/0165100 A1 Jun. 14, 2018

(51) Int. Cl.
*G06F 9/44* (2018.01)
*G06F 9/4401* (2018.01)
*G06F 11/10* (2006.01)

(52) U.S. Cl.
CPC .......... *G06F 9/4406* (2013.01); *G06F 11/106* (2013.01)

(58) Field of Classification Search
CPC .............................. G06F 9/4406; G06F 11/106
See application file for complete search history.

(56) References Cited

U.S. PATENT DOCUMENTS

| | | |
|---|---|---|
| 5,790,850 A | 8/1998 | Natu |
| 5,835,704 A | 11/1998 | Li et al. |
| 6,721,868 B1 | 4/2004 | Natu et al. |
| 6,944,728 B2 | 9/2005 | Calderon et al. |
| 7,065,628 B2 | 6/2006 | Calderon et al. |
| 7,460,545 B1 | 12/2008 | Calderon et al. |
| 7,493,460 B2 | 2/2009 | Zimmer et al. |
| 7,984,286 B2 | 7/2011 | Zimmer et al. |
| 8,407,516 B2 | 3/2013 | Swanson et al. |
| 8,473,945 B2 | 6/2013 | Datta et al. |
| 8,694,761 B2 | 4/2014 | Zimmer et al. |
| 8,843,732 B2 | 9/2014 | Natu et al. |
| 9,448,867 B2 | 9/2016 | Datta et al. |
| 2003/0223442 A1 | 12/2003 | Huang et al. |
| 2007/0214347 A1* | 9/2007 | Rothman ............ G06F 12/0646 713/1 |
| 2011/0131399 A1* | 6/2011 | Sainath ................. G06F 11/106 713/2 |
| 2011/0213955 A1* | 9/2011 | Takai .................... G06F 9/4401 713/2 |
| 2015/0277930 A1* | 10/2015 | Sarangdhar ........... G06F 21/575 713/2 |
| 2015/0278068 A1 | 10/2015 | Swanson et al. |

\* cited by examiner

*Primary Examiner* — Albert Wang
(74) *Attorney, Agent, or Firm* — Jordan IP Law, LLC

(57) ABSTRACT

An embodiment of a memory apparatus may include a system memory, and a memory manager communicatively coupled to the system memory to determine a first amount of system memory needed for a boot process, initialize the first amount of system memory, start the boot process, and initialize additional system memory in parallel with the boot process. Other embodiments are disclosed and claimed.

19 Claims, 5 Drawing Sheets

BOOT PROCESS WITH PARALLEL MEMORY INITIALIZATION

TECHNICAL FIELD

Embodiments generally relate to memory systems. More particularly, embodiments relate to a boot process with parallel memory initialization.

BACKGROUND

Boot time may be a problem on some server platforms. A significant component of the boot time may include memory configuration time. As memory capacity increases the amount of time needed for memory configuration may also increase.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. Non-limiting examples of nonvolatile memory may include any or a combination of: solid state memory (such as planar or three dimensional (3D) NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
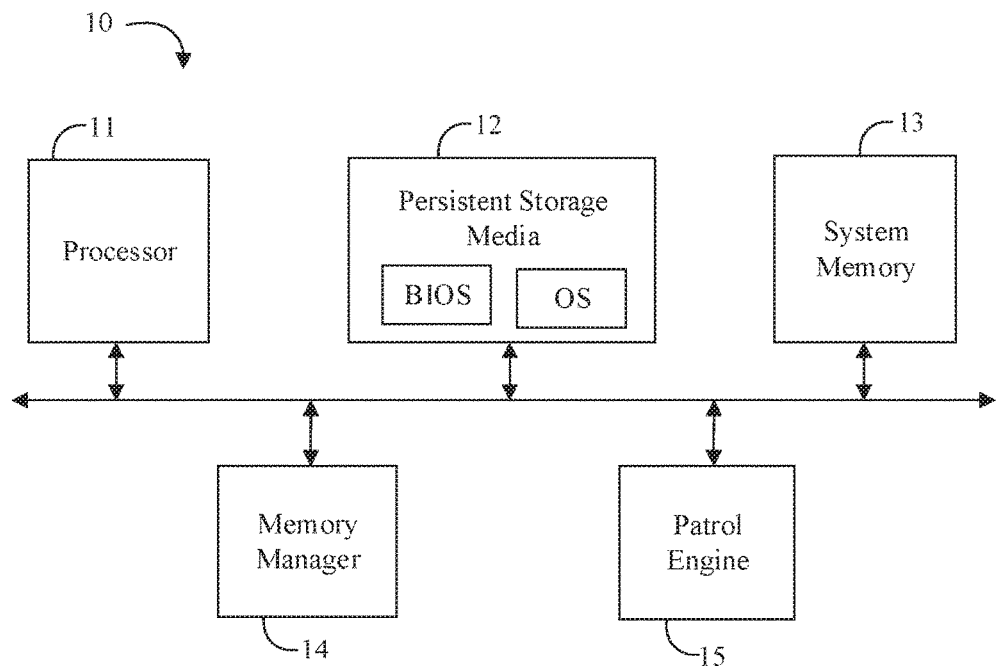
FIG. 1 is a block diagram of an example of an electronic processing system according to an embodiment.

Turning now to FIG. 1, an embodiment of an electronic processing system 10 may include a processor 11, a persistent storage media 12 communicatively coupled to the processor 11 to store a basic input/output system (BIOS) and an operating system (OS), a system memory 13 communicatively coupled to the processor 11, and a memory manager 14 communicatively coupled to the system memory 13. The memory manager 14 may be configured to retrieve a first parameter which corresponds to a first amount of system memory 13 needed for a BIOS load process, initialize the first amount of system memory 13 in accordance with the retrieved first parameter, start the BIOS load process, and initialize additional system memory 13 in parallel with the BIOS load process.

In some embodiments of the electronic processing system 10, the memory manager may be further configured to retrieve a second parameter which corresponds to an amount of write credits to allocate to a patrol engine 15 (e.g. the amount of write credits to allocate to the patrol engine 15 may be more than fifty percent of the write credits), and allocate the amount of write credits to the patrol engine 15 in accordance with the retrieved second parameter. For example, the patrol engine 15 may be configured to write full cache lines of zeros to the system memory 13 without reading the system memory 13. The memory manager 14 may be further configured to retrieve a third parameter which corresponds to a second amount of system memory 13 needed for an OS load process after the BIOS load process, initialize the second amount of system memory 13 in accordance with the retrieved third parameter, start the OS load process, and initialize additional system memory 13 in parallel with the OS load process.

Embodiments of each of the above processor 11, persistent storage media 12, system memory 13, memory manager 14, patrol engine 15, and other components of the electronic processing system 10 may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, some operational aspects of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 2:
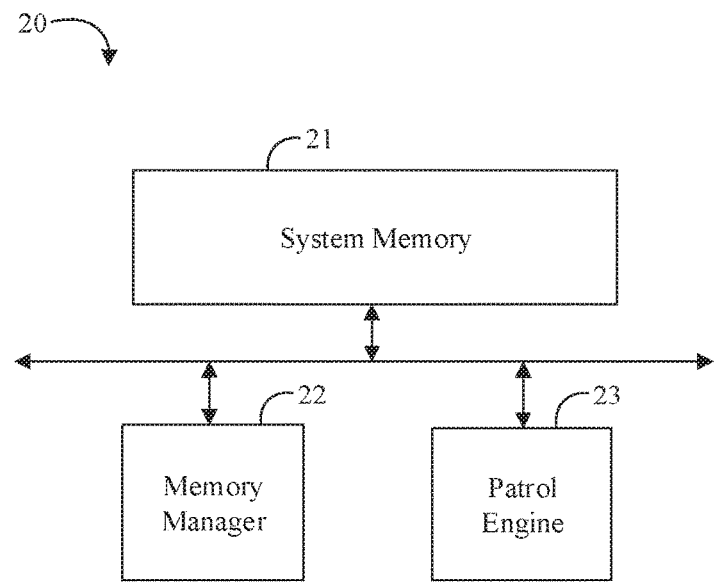
FIG. 2 is a block diagram of an example of a memory apparatus according to an embodiment.

Turning now to FIG. 2, an embodiment of a memory apparatus 20 may include a system memory 21, and a memory manager 22 communicatively coupled to the system memory 21 to determine a first amount of system memory 21 needed for a boot process, initialize the first amount of system memory 21, start the boot process, and initialize additional system memory 21 in parallel with the boot process. Some embodiments of the memory apparatus 20 may further include a patrol engine 23 communicatively coupled to the system memory 21 to patrol scrub the system memory 21. For example, the patrol engine 23 may be further configured to write full cache lines of zeros to the system memory 21 without reading the system memory 21.

The memory manager 22, the patrol engine 23, and/or the patrol scrub logic may be part of a memory controller, in some embodiments of the memory apparatus 20. For example, the memory controller may handle demand requests (e.g. requests coming from a program in execution) and also background scrub requests issued by the patrol engine 23. The memory controller may merge these two streams and generate transactions to the system memory 21 (e.g. over a memory bus).

In some embodiments of the memory apparatus 20, the memory manager 22 may be further configured to allocate more than one write credit to the patrol engine 23. For example, the memory manager 22 may be further configured to allocate more than fifty percent of the write credits to the patrol engine 23. In some embodiments, the first amount of system memory 21 and the amount of write credits may be configurable. For example, the memory manager 22 may be further configured to retrieve a first parameter which corresponds to an amount of system memory 21 needed for the boot process, determine the first amount of system memory 21 in accordance with the retrieved first parameter, retrieve a second parameter which corresponds to an amount of write credits to allocate to the patrol engine 23, and allocate the amount of write credits to the patrol engine 23 in accordance with the retrieved second parameter.

Some embodiments may advantageously cooperate with the OS to further parallelize the system memory initialization process. For example, the memory manager 22 may be further configured to determine a second amount of system memory 21 needed for an OS load process after the boot process, initialize the second amount of system memory 21, start the OS load process, and initialize additional system memory 21 in parallel with the OS load process.

Embodiments of each of the above system memory 21, memory manager 22, patrol engine 23, and other components of the memory apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, some operational aspects of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++, C# or the like and conventional procedural programming languages, such as the "C" programming language or similar programming languages.

Figure 3A:
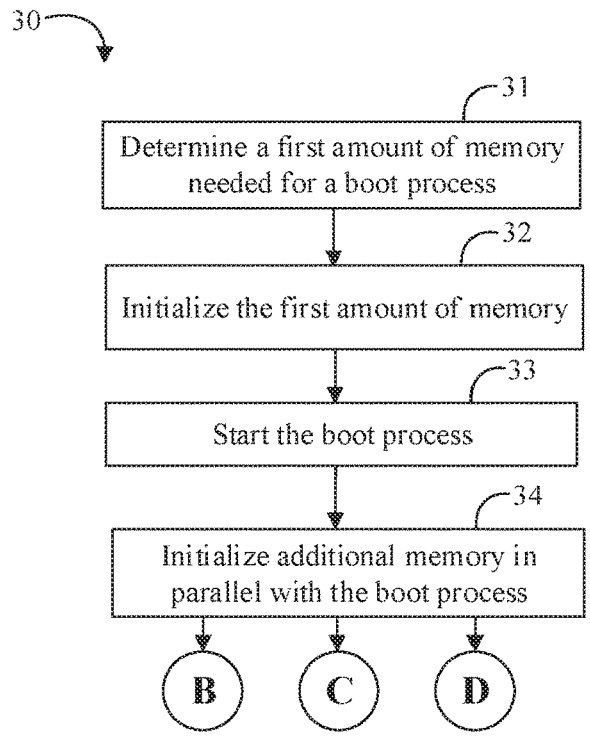
FIGS. 3A to 3D are flowcharts of an example of a method of managing memory according to an embodiment.
Figure 3B:
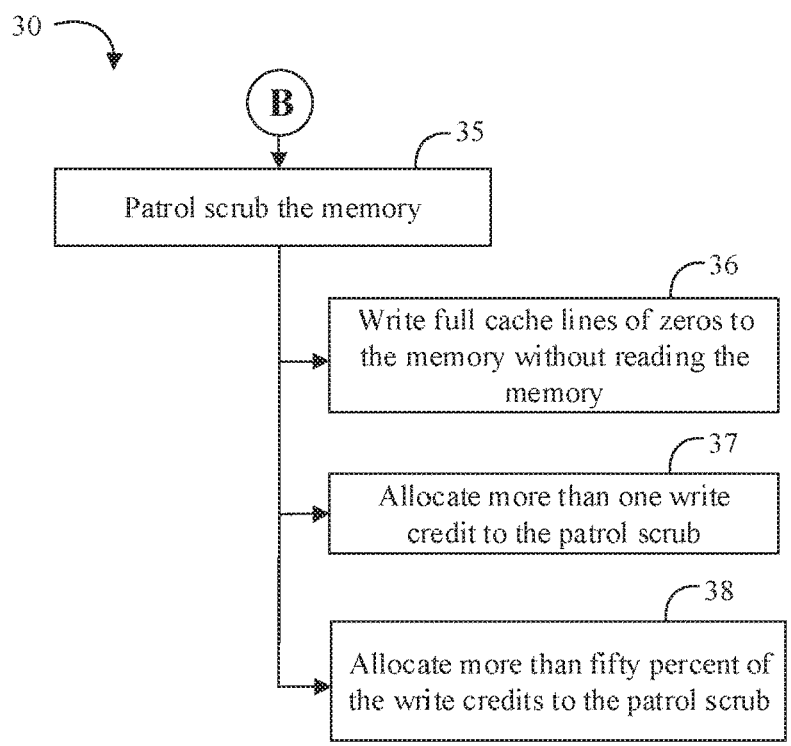
Figures 3C, 3D:
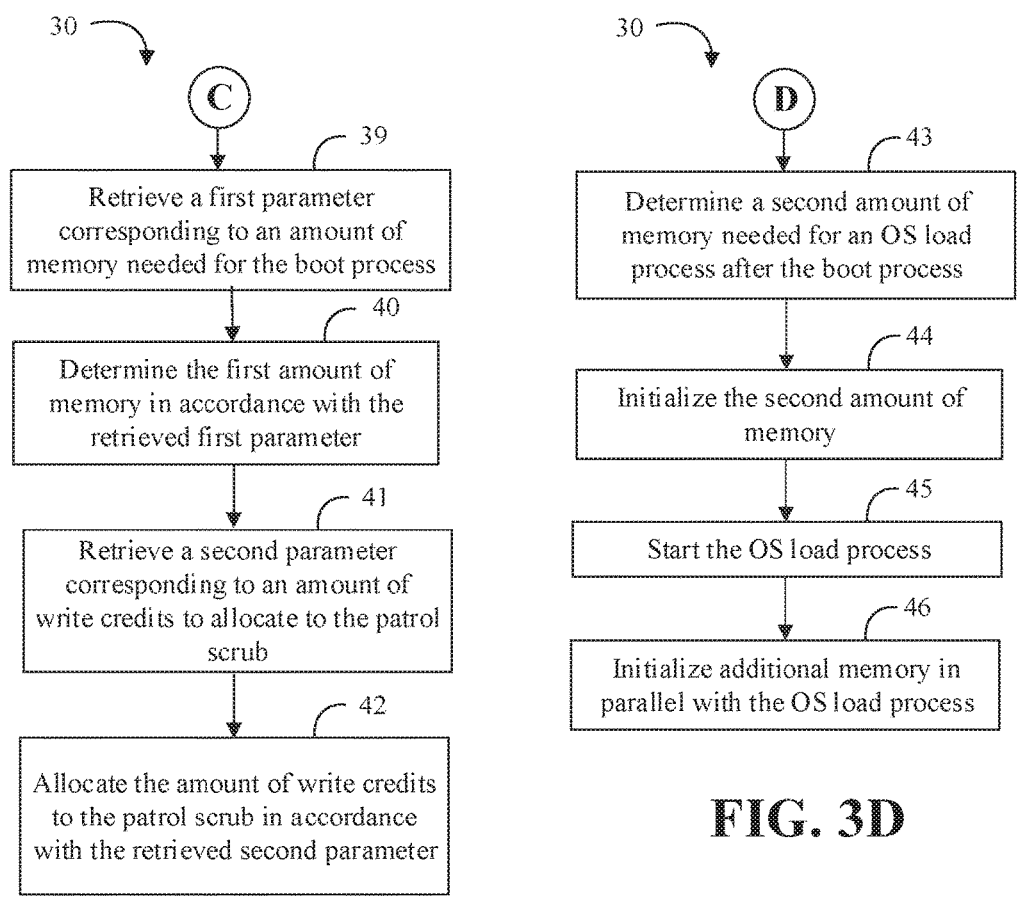

Turning now to FIG. 3, an embodiment of a method 30 of managing memory may include determining a first amount of memory needed for a boot process at block 31, initializing the first amount of memory at block 32, starting the boot process at block 33, and initializing additional memory in parallel with the boot process at block 34. For example, any of the initializing may include patrol scrubbing the memory at block 35. In some embodiments of the method 30, patrol scrubbing the memory may include writing full cache lines of zeros to the memory without reading the memory at block 36. The method 30 may further include allocating more than one write credit to the patrol scrubbing at block 37. For example, the method 30 may further include allocating more than fifty percent of the write credits to the patrol scrubbing at block 38.

Some embodiments of the method 30 may further include retrieving a first parameter corresponding to an amount of memory needed for the boot process at block 39, determining the first amount of memory in accordance with the retrieved first parameter at block 40, retrieving a second parameter corresponding to an amount of write credits to allocate to the patrol scrubbing at block 41, and allocating the amount of write credits to the patrol scrubbing in accordance with the retrieved second parameter at block 42. The method 30 may also include determining a second amount of memory needed for an OS load process after the boot process at block 43, initializing the second amount of memory at block 44, starting the OS load process at block 45, and initializing additional memory in parallel with the OS load process at block 46.

Embodiments of the method 30 may be implemented in an electronic processing system or a memory apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages. For example, embodiments of the method 30 may be implemented on a computer readable medium as described in connection with Examples 18 to 24 below.

Without being limited to theory of operation, boot time may be a challenge on some server platforms. A significant component of the boot time may include memory configuration time, of which about one third may be spent scrubbing memory to ensure it has valid error-correcting code (ECC). In some systems, the BIOS may be using a Converged-Pattern-Generator-Checker (CPGC) engine in the memory controller to scrub ECC. The CPGC ECC scrub step must be completed before the memory can be used. The CPGC engine may scrub ECC by writing zero to each location. As a result, the memory ECC scrub time is proportional to the dual-inline memory module (DIMM) size and the memory channel bandwidth. Because DIMM size may increase faster than the bandwidth, the ECC scrub time may increase and lead to longer boot times.

Advantageously, some embodiments described herein may provide a mechanism to speed up boot by performing memory ECC initialization in the background. For example, some embodiments may enable most of the ECC scrub to occur in the background using a patrol memory engine while rest of the BIOS performs other initializations steps. Advantageously, this parallelization may lead to reduction in overall boot time as described in further detail below.

Figure 4:
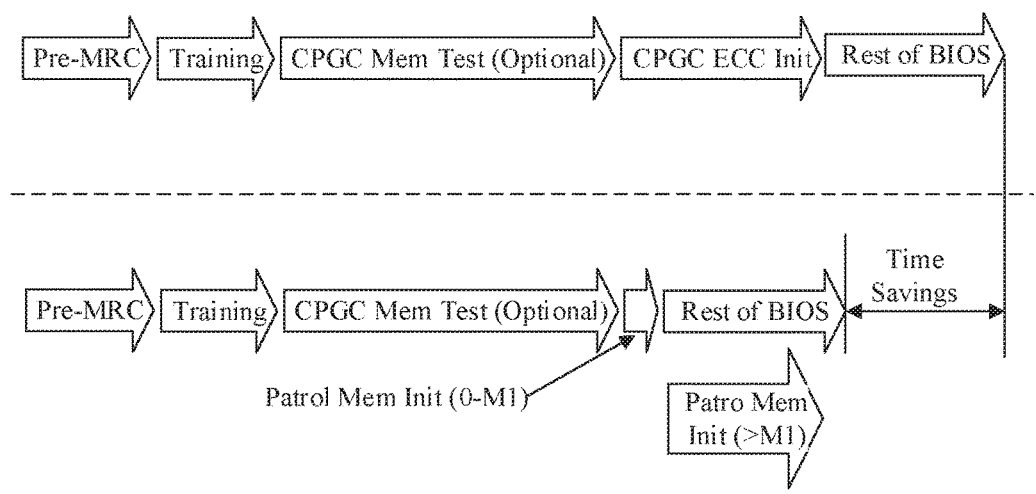
FIG. 4 is an illustrative diagram comparing another boot process to an example of a boot process according to an embodiment.

Turning now to FIG. 4, an illustrative diagram compares a first boot process above the dashed line with a second boot process in accordance with an embodiment below the dashed line. Both boot processes begin with a pre-memory reference code (MRC) stage, followed by a training stage and an optional CPGC memory test stage. In the first boot process the entire system memory undergoes a CPGC ECC initialization stage before proceeding to the rest of the BIOS load process. Advantageously, the second boot process performs a patrol memory initialization on a first amount of the system memory (e.g. zero to M1, where M1 is configurable). After the first amount of the system memory is initialized, the rest of the BIOS load process proceeds in parallel with additional patrol memory initialization of the rest of the system memory (e.g. for memory capacity above M1). If the duration of the remaining memory initialization is shorter than duration of the rest of BIOS load process, then the time savings may correspond to the duration of the remaining memory initialization. On the other hand, if the duration of the remaining memory initialization is longer than the duration of the rest of the BIOS load process, then the time savings may correspond to the duration of the rest of the BIOS load process. The second boot process in accordance with an embodiment may advantageously be shorter than the first boot process (e.g. so long as sufficient write credits are allocated to the patrol memory initialization). It is estimated that the time savings for a system with 32 GB registered DIMM (RDIMM) and either 128 GB or 256 GB load-reduced DIMM (LRDIMM) may be about 20 percent or more for the second boot process as compared to the first boot process.

The BIOS/Unified Extensible Firmware Interface (UEFI) may have two phases. Namely, a pre-memory phase and post-memory phase. In accordance with some embodiments, an ECC scrub of a first amount of the DRAM (e.g. memory addresses 0 to M1, e.g. where M1=4 GB; or several ranges of non-contiguous memory totaling 4 GB) may be performed at a pre-memory phase of the BIOS/UEFI boot process. The ECC scrub of the rest of the DRAM may then performed in parallel with the post-memory phase of the boot process (e.g. simultaneous execution). Advantageously, in some embodiments the BIOS/UEFI may run within 4 GB of DRAM and in some embodiments may be configured to ensure that there are no demand accesses to DRAM above 4 GB until after the boot process completes. In some embodiments, M1 may be configurable based on how much RAM the boot process requires and may be stored as a boot parameter that can be retrieved to perform the needed amount of ECC scrub for the post-memory phase.

In some embodiments, a memory controller subsystem may be advantageously modified to add a fast, write-only mode to the patrol scrubber. For example, the patrol scrubber, when in normal mode, may read an address location, detect and correct an ECC error and then write (e.g. scrub) the corrected data back to memory. When configured in the fast, write-only mode, however, the patrol scrubber in accordance with some embodiments may write a full cache line of zeroes without performing the patrol read first. For example, performing the read may be unnecessary when in this mode because the goal of memory initialization is to write correctly scrambled zero data with the correct ECC to memory. Advantageously, skipping the read may speed up the operations and also avoid consumption/signaling of any bad ECC.

In some embodiments, a memory controller subsystem may advantageously further modify a credit allocation scheme so that the patrol scrubber may use more or most of write pending queue credits (e.g. W1%, where W1>50) during memory initialization while demand writes from core/BIOS may use the rest. Advantageously, the BIOS/UEFI execution may typically use only a small fraction of the total memory bandwidth such that allocating a greater proportion of the write credits to the patrol scrubber does not negatively impact the boot process. After the entire memory is initialized, the hardware may automatically snap the credit allocation to a default allocation (e.g. 1 write credit for patrol, rest for demand accesses). For example, because the patrol scrubber may be finished/stopped at this time, the credits may be safely re-allocated. The credits may be added back to the demand pool without disturbing any demand accesses in progress. In some embodiments, W1 may be configurable based on how many write credits the boot process requires and may be stored as a boot parameter that can be retrieved to allocate the needed amount of write credits for the post-memory phase.

In some embodiments (e.g. when running a shrink-wrap OS), the BIOS/UEFI may ensure memory scrub is complete before handing off control to OS bootloader. As a result, the improvements described herein may remain transparent to the OS bootloader, the OS, and the applications. As noted above, some of the parameters like the amount of memory available to BIOS and the percent of credits allocated to the patrol engine may be tuned based on the system configuration. In some segments (e.g. such as the Internet-Of-Things (IOT)), further improvements may be made to the overall boot time. For example, an OS memory manager may be made aware of the background scrub, and the memory scrub process may extend into an OS initialization phase (e.g. further memory initialization in parallel with the OS load process).

As compared to another approach where memory may be kept in self-refresh across a warm reset to skip ECC during a warm boot, some embodiments may avoid one or more of the following shortcomings: 1) this approach does not address cold boot issues; and/or 2) this approach may retain data from a prior boot, which may compromise data security. As compared to another approach where a DIMM hardware zeroing feature may be used, some embodiments may avoid one or more of the following shortcomings: 1) some memory controllers may be required to scramble the data on the bus to avoid longs strings of zeros and ones, and the DIMM-based zeroing does not account for the scrambling thus resulting in bad ECC data from the memory controller standpoint; and/or 2) the memory controller may still need to walk through every memory location to convert unscrambled zeros to scrambled zeros, which may take just as long as an ECC scrub.

Figures 5A, 5B:
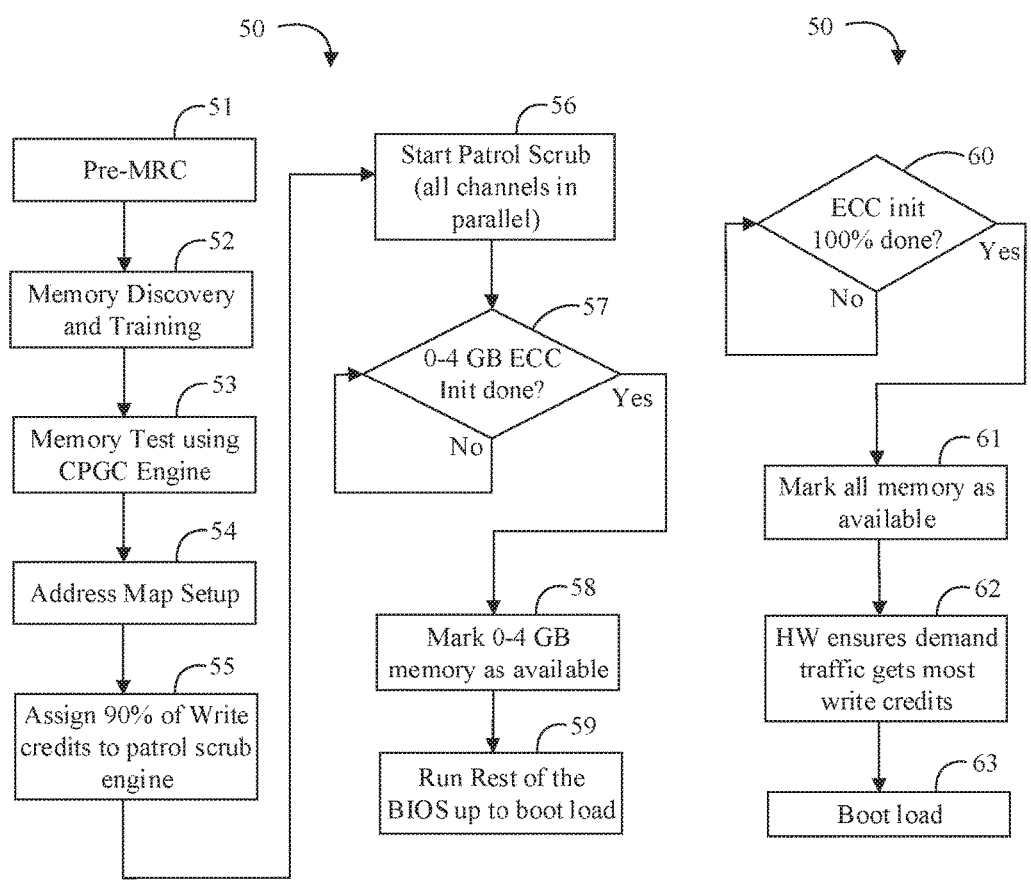
FIGS. 5A and 5B are flowcharts of an example of boot process according to an embodiment.

Turning now to FIGS. 5A and 5B, a method 50 of booting an electronic system may include no particular changes to the BIOS flow up to and including memory test, for example, including pre-MRC at block 51, memory discovery and training at block 52, and memory test using CPGC engine at block 53. After the memory test is done, the BIOS may set up an address map prior to ECC initialization at block 54. After the address map setup, the BIOS may program the patrol scrub engine in each channel in a fast, write-only mode, where the BIOS allocates about ninety percent (90%) of the write credits to the patrol engines at block 55 and starts them in parallel at block 56. Advantageously, the higher credit count may enable the patrol scrub engines to write zeros to the memory much quicker. Ordinarily, for example, the patrol scrub engine may only be allocated one (1) write credit. With one credit, the background scrub using patrol engine may take longer than rest of the BIOS.

In some embodiments of the method 50, the patrol scrub engines may include a register that exposes the highest memory address that has been scrubbed. the pre-memory phase of the BIOS may wait at block 57 until the first 4 GB of memory is scrubbed (ignoring that part of the system address below 4 GB may be set aside for memory-mapped input/output (MMIO) for brevity), and marks the first range of memory as available at block 58. The method 50 may then hand off control to the post-memory phase of the BIOS at block 59.

The memory manager in the post-memory BIOS may allocate DRAM from below the 4 GB range. This may ensure no UEFI driver will utilize uninitialized memory. However, this does not prevent programming of MMIO BARs and access to MMIO BARs above 4 GB. Prior to invoking the bootloader (e.g. EFI BOOT#### target), the BIOS may wait until all of the memory is ECC initialized at block 60 (e.g. in the event that the remaining ECC initialization takes longer than the rest of the BIOS load process). At block 61, all the memory may be marked as available and the hardware may then ensure that the write credit allocation is changed back to the default (e.g. patrol engine gets 1 credit, demand traffic gets the rest) at block 62. At block 63, the OS boot may proceed normally, with fully initialized memory.

Additional Notes and Examples:

Example 1 may include an electronic processing system, comprising a processor, a persistent storage media communicatively coupled to the processor to store a basic input/output system (BIOS) and an operating system (OS), a system memory communicatively coupled to the processor, and a memory manager communicatively coupled to the system memory to retrieve a first parameter which corresponds to a first amount of system memory needed for a BIOS load process, initialize the first amount of system memory in accordance with the retrieved first parameter, start the BIOS load process, and initialize additional system memory in parallel with the BIOS load process.

Example 2 may include the electronic processing system of Example 1, wherein the memory manager is further to retrieve a second parameter which corresponds to an amount of write credits to allocate to a patrol engine, wherein the amount of write credits to allocate to the patrol engine is more than fifty percent of the write credits, and allocate the amount of write credits to the patrol engine in accordance with the retrieved second parameter, and wherein the patrol engine is to write full cache lines of zeros to the system memory without reading the system memory.

Example 3 may include the electronic processing system of any of Examples 1 to 2, wherein the memory manager is further to retrieve a third parameter which corresponds to a second amount of system memory needed for an OS load process after the BIOS load process, initialize the second amount of system memory in accordance with the retrieved third parameter, start the OS load process, and initialize additional system memory in parallel with the OS load process.

Example 4 may include a memory apparatus, comprising a system memory, and a memory manager communicatively coupled to the system memory to determine a first amount of system memory needed for a boot process, initialize the first amount of system memory, start the boot process, and initialize additional system memory in parallel with the boot process.

Example 5 may include the memory apparatus of Example 4, further comprising a patrol engine communicatively coupled to the system memory to patrol scrub the system memory.

Example 6 may include the memory apparatus of Example 5, wherein the patrol engine is further to write full cache lines of zeros to the system memory without reading the system memory.

Example 7 may include the memory apparatus of any of Examples 5 to 6, wherein the memory manager is further to allocate more than one write credit to the patrol engine.

Example 8 may include the memory apparatus of Example 7, wherein the memory manager is further to allocate more than fifty percent of the write credits to the patrol engine.

Example 9 may include the memory apparatus of any of Examples 5 to 6, wherein the memory manager is further to retrieve a first parameter which corresponds to an amount of system memory needed for the boot process, determine the first amount of system memory in accordance with the retrieved first parameter, retrieve a second parameter which corresponds to an amount of write credits to allocate to the patrol engine, and allocate the amount of write credits to the patrol engine in accordance with the retrieved second parameter.

Example 10 may include the memory apparatus of any of Examples 4 to 6, wherein the memory manager is further to determine a second amount of system memory needed for an operating system load process after the boot process, initialize the second amount of system memory, start the operating system load process, and initialize additional system memory in parallel with the operating system load process.

Example 11 may include a method of managing memory, comprising determining a first amount of memory needed for a boot process, initializing the first amount of memory, starting the boot process, and initializing additional memory in parallel with the boot process.

Example 12 may include the method of Example 11, wherein any of the initializing comprises patrol scrubbing the memory.

Example 13 may include the method of Example 12, wherein patrol scrubbing the memory comprises writing full cache lines of zeros to the memory without reading the memory.

Example 14 may include the method of any of Examples 12 to 13, further comprising allocating more than one write credit to the patrol scrubbing.

Example 15 may include the method of Example 14, further comprising allocating more than fifty percent of the write credits to the patrol scrubbing.

Example 16 may include the method of any of Examples 12 to 13, further comprising retrieving a first parameter corresponding to an amount of memory needed for the boot process, determining the first amount of memory in accordance with the retrieved first parameter, retrieving a second parameter corresponding to an amount of write credits to allocate to the patrol scrubbing, and allocating the amount of write credits to the patrol scrubbing in accordance with the retrieved second parameter.

Example 17 may include the method of any of Examples 11 to 13, further comprising determining a second amount of memory needed for an operating system load process after the boot process, initializing the second amount of memory, starting the operating system load process, and initializing additional memory in parallel with the operating system load process.

Example 18 may include at least one computer readable medium, comprising a set of instructions, which when executed by a computing device, cause the computing device to determine a first amount of memory needed for a boot process, initialize the first amount of memory, start the boot process, and initialize additional memory in parallel with the boot process.

Example 19 may include the at least one computer readable medium of Example 18, comprising a further set of instructions, which when executed by a computing device, cause the computing device to patrol scrub the memory.

Example 20 may include the at least one computer readable medium of Example 19, comprising a further set of instructions, which when executed by a computing device, cause the computing device to write full cache lines of zeros to the memory without reading the memory.

Example 21 may include the at least one computer readable medium of any of Examples 19 to 20, comprising a further set of instructions, which when executed by a computing device, cause the computing device to allocate more than one write credit to patrol scrub the memory.

Example 22 may include the at least one computer readable medium of Example 21, comprising a further set of instructions, which when executed by a computing device, cause the computing device to allocate more than fifty percent of the write credits to patrol scrub the memory.

Example 23 may include the at least one computer readable medium of any of Examples 19 to 20, comprising a further set of instructions, which when executed by a computing device, cause the computing device to retrieve a first parameter corresponding to an amount of memory needed for the boot process, determine the first amount of memory in accordance with the retrieved first parameter, retrieve a second parameter corresponding to an amount of write credits to allocate to patrol scrub the memory, and allocate the amount of write credits to patrol scrub the memory in accordance with the retrieved second parameter.

Example 24 may include the at least one computer readable medium of any of Examples 18 to 20, comprising a further set of instructions, which when executed by a computing device, cause the computing device to determine a second amount of memory needed for an operating system load process after the boot process, initialize the second amount of memory, start the operating system load process, and initialize additional memory in parallel with the operating system load process.

Example 25 may include a memory management apparatus, comprising means for determining a first amount of memory needed for a boot process, means for initializing the first amount of memory, means for starting the boot process, and means for initializing additional memory in parallel with the boot process.

Example 26 may include the memory management apparatus of Example 25, wherein any of the initializing comprises means for patrol scrubbing the memory.

Example 27 may include the memory management apparatus of Example 26, wherein patrol scrubbing the memory comprises means for writing full cache lines of zeros to the memory without reading the memory.

Example 28 may include the memory management apparatus of any of Examples 26 to 27, further comprising means for allocating more than one write credit to the patrol scrubbing.

Example 29 may include the memory management apparatus of Example 28, further comprising means for allocating more than fifty percent of the write credits to the patrol scrubbing.

Example 30 may include the memory management apparatus of any of Examples 26 to 27, further comprising means for retrieving a first parameter corresponding to an amount of memory needed for the boot process, means for determining the first amount of memory in accordance with the retrieved first parameter, means for retrieving a second parameter corresponding to an amount of write credits to allocate to the patrol scrubbing, and means for allocating the amount of write credits to the patrol scrubbing in accordance with the retrieved second parameter.

Example 31 may include the memory management apparatus of any of Examples 25 to 27, further comprising means for determining a second amount of memory needed for an operating system load process after the boot process, means for initializing the second amount of memory, means for starting the operating system load process, and means for initializing additional memory in parallel with the operating system load process.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   a persistent storage media communicatively coupled to the processor to store a basic input/output system (BIOS) and an operating system (OS);
   a system memory communicatively coupled to the processor;
   a patrol engine communicatively coupled to the system memory to patrol scrub the system memory; and
   a memory manager communicatively coupled to the system memory to:
      retrieve a first parameter which corresponds to a first amount of the system memory needed for a BIOS load process,
      initialize the first amount of the system memory in accordance with the retrieved first parameter,
      start the BIOS load process,
      initialize an additional amount of the system memory in parallel with the BIOS load process, and
      allocate more than one write credit to the patrol engine.

2. The electronic processing system of claim 1, wherein the memory manager is further to:
   retrieve a second parameter which corresponds to an amount of write credits to allocate to the patrol engine, wherein the amount of the write credits to allocate to the patrol engine is more than fifty percent of the write credits; and
   allocate the amount of the write credits to the patrol engine in accordance with the retrieved second parameter,
   and wherein the patrol engine is to write full cache lines of zeros to the system memory without reading the system memory.

3. The electronic processing system of claim 1, wherein the memory manager is further to:
   retrieve a third parameter which corresponds to a second amount of the system memory needed for an OS load process after the BIOS load process;
   initialize the second amount of the system memory in accordance with the retrieved third parameter;
   start the OS load process; and
   initialize an additional amount of the system memory in parallel with the OS load process.

4. A memory apparatus, comprising:
   a system memory;
   a patrol engine communicatively coupled to the system memory to patrol scrub the system memory; and
   a memory manager communicatively coupled to the system memory to:
      determine a first amount of the system memory needed for a boot process,
      initialize the first amount of the system memory,
      start the boot process,
      initialize an additional amount of the system memory in parallel with the boot process, and
      allocate more than one write credit to the patrol engine.

5. The memory apparatus of claim 4, wherein the patrol engine is further to write full cache lines of zeros to the system memory without reading the system memory.

6. The memory apparatus of claim 4, wherein the memory manager is further to allocate more than fifty percent of write credits to the patrol engine.

7. The memory apparatus of claim 4, wherein the memory manager is further to:
   retrieve a first parameter which corresponds to an amount of the system memory needed for the boot process;
   determine the first amount of the system memory in accordance with the retrieved first parameter;
   retrieve a second parameter which corresponds to an amount of write credits to allocate to the patrol engine; and
   allocate the amount of the write credits to the patrol engine in accordance with the retrieved second parameter.

8. The memory apparatus of claim 4, wherein the memory manager is further to:
   determine a second amount of the system memory needed for an operating system load process after the boot process;
   initialize the second amount of the system memory;
   start the operating system load process; and
   initialize an additional amount of the system memory in parallel with the operating system load process.

9. A method of managing memory, comprising:
   determining a first amount of a memory needed for a boot process;
   initializing the first amount of the memory;
   starting the boot process;
   initializing an additional amount of the memory in parallel with the boot process;
   patrol scrubbing the memory; and
   allocating more than one write credit to the patrol scrubbing.

10. The method of claim 9, wherein any of the initializing comprises:
    the patrol scrubbing the memory.

11. The method of claim 10, wherein the patrol scrubbing the memory comprises:
    writing full cache lines of zeros to the memory without reading the memory.

12. The method of claim 10, further comprising:
retrieving a first parameter corresponding to an amount of the memory needed for the boot process;
determining the first amount of the memory in accordance with the retrieved first parameter;
retrieving a second parameter corresponding to an amount of write credits to allocate to the patrol scrubbing; and
allocating the amount of the write credits to the patrol scrubbing in accordance with the retrieved second parameter.

13. The method of claim 9, further comprising:
allocating more than fifty percent of write credits to the patrol scrubbing.

14. The method of claim 9, further comprising:
determining a second amount of the memory needed for an operating system load process after the boot process;
initializing the second amount of the memory;
starting the operating system load process; and
initializing an additional amount of the memory in parallel with the operating system load process.

15. At least one non-transitory computer readable medium, comprising a set of instructions, which when executed by a computing device, cause the computing device to:
determine a first amount of a memory needed for a boot process;
initialize the first amount of the memory;
start the boot process;
initialize an additional amount of the memory in parallel with the boot process;
patrol scrub the memory; and
allocate more than one write credit to patrol scrub the memory.

16. The at least one non-transitory computer readable medium of claim 15, comprising a further set of instructions, which when executed by a computing device, cause the computing device to:
write full cache lines of zeros to the memory without reading the memory.

17. The at least one non-transitory computer readable medium of claim 15, comprising a further set of instructions, which when executed by a computing device, cause the computing device to:
allocate more than fifty percent of write credits to patrol scrub the memory.

18. The at least one non-transitory computer readable medium of claim 15, comprising a further set of instructions, which when executed by a computing device, cause the computing device to:
retrieve a first parameter corresponding to an amount of the memory needed for the boot process;
determine the first amount of the memory in accordance with the retrieved first parameter;
retrieve a second parameter corresponding to an amount of write credits to allocate to patrol scrub the memory; and
allocate the amount of the write credits to patrol scrub the memory in accordance with the retrieved second parameter.

19. The at least one non-transitory computer readable medium of claim 15, comprising a further set of instructions, which when executed by a computing device, cause the computing device to:
determine a second amount of the memory needed for an operating system load process after the boot process;
initialize the second amount of the memory;
start the operating system load process; and
initialize an additional amount of the memory in parallel with the operating system load process.

* * * * *